United States Patent Office 3,010,782
Patented Nov. 28, 1961

3,010,782
CORROSION INHIBITING METHOD
AND COMPOSITION
Kirtland E. McCaleb, Leonard Vertnik, and Donald L. Andersen, Minneapolis, Minn., assignors to General Mills, Inc., a corporation of Delaware
No Drawing. Filed Jan. 18, 1960, Ser. No. 2,804
2 Claims. (Cl. 21—2.7)

The present invention relates to a composition and method for inhibiting the corrosion of metallic substances. More particularly, it relates to novel polyamines and their use as corrosion inhibitors.

The corrosion of metallic surfaces presents a widespread and major industrial problem. Corrosion occurs most commonly when ferrous surfaces such as iron, steel and ferrous alloys come in contact with corrosive acids and/or oxidizing agents in aqueous media, i.e. water vapor, water and oil emulsions, solutions and the like. To a lesser degree other metals such as copper, brass and aluminum are also subject to such corrosive attack.

It has now been discovered that the novel compounds having formula $R(CH_2NHCH_2CH_2CH_2NH_2)_n$ in which R is the hydrocarbon radical of the polymeric fat acid $R(COOH)_n$ obtained by the polymerization of an unsaturated higher fatty acid, and $n$ is 2–3, are exceptional corrosion inhibitors which are especially useful in protecting ferrous meals from corrosive attack in the presence of water and oil phases. These novel compounds hereinafter referred to as polymeric fat acid diamines may be utilized as corrosion inhibitors in the chemical process industry, the oil refining or processing industry and a wide variety of other industrial processes where the inhibition of the corrosion of metallic substances is desired.

The polymeric fat acid diamines are conveniently prepared by first converting polymeric fat acids to polymeric fat acid amines and then reacting these amines with acrylonitrile. The resultant adducts are then catalytically reduced to form the polymeric fat acid diamines.

The polymeric fat acid amines may be prepared directly from the polymeric fat acids by reacting the acids with ammonia to produce the corresponding polymeric fat acid nitriles and subsequently hydrogenating those nitriles to the corresponding amines. It is also possible to prepare polymeric fat acid amines by reacting octadecadienoic acid with ammonia at 280–400° C., which results in both a polymerization and nitrile formation. The polymeric fat acid nitrile thus formed may then be hydrogenated in the presence of a hydrogenation catalyst under hydrogen pressure at a moderate temperature (50–170° C.), to produce the polymeric fat acid amines. These polymeric fat acid amines have essentially the same structure as the polymeric fat acids of commerce, except that the carboxyl groups are replaced by —$CH_2NH_2$ groups.

The mixture of polymeric fat acid amines prepared by the above described methods contains a preponderance of dimer amine in admixture with some trimers and higher polymers as well as some monomeric amine.

In preparing the novel compounds of the present invention, one equivalent of acrylonitrile is reacted with each primary amino group of the polymeric fat acid amines, preferably in the presence of methanol to form the intermediate acrylonitrile adducts. These nitriles are then reduced under hydrogen pressure in the presence of ammonia and a metallic hydrogenation catalyst such as Raney nickel to form the polymeric fat acid diamines. The reactions which are believed to take place are illustrated by the following formulas,

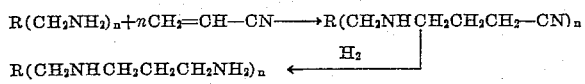

in which R represents the hydrocarbon radical of the polymeric fat acids $R(COOH)_n$ obtained by the polymerization of an unsaturated higher fatty acid, and $n$ is 2–3.

In any case the basic raw materials for the preparation of the products of the present invention are the fatty acids having sufficient double bond functionality to form the polymeric material. One analytical method for describing mixtures of fatty acids having sufficient double bond functionality is by reference to its iodine number, that is the number of grams of iodine equivalent to the halogen absorbed by a 100 gram sample. Generally speaking, acids having an iodine number of at least 120 will have sufficient double bond functionality to form the desired polymer. An ideal starting material would be pure linoleic acid. It will be appreciated, however, that the acids of nature appear as a complex mixture and the isolation of pure linoleic acid is commercially impractical. For this reason, sources rich in linoleic acid are used as starting materials. Oils such as soybean, linseed, tung, perilla, cottonseed, corn, sunflower, safflower and dehydrated castor oil as well as tall oil and soap stock provide convenient sources from which linoleic acid rich fatty acid mixtures may be obtained by crystallization and/or distillation procedures.

The preparation of the novel compounds of the present invention is further illustrated by reference to the following example.

Example

A 500 cc. flask equipped with a dropping funnel, thermometer, reflux condenser and mechanical stirrer was charged with 18 grams of methanol and 299 grams of the polymeric fat acid amines prepared by reacting polymeric fat acid containing a preponderance of dilinoleic acid with ammonia at 280–400° C. and then hydrogenating the thus formed nitrile (equivalent weight=278, based on saponification) in the presence of a Raney nickel catalyst under hydrogen pressure at a moderate temperature (50–170° C.). After its contents were heated with stirring to 79° C., the external heat was removed and the total of 56 grams of acrylonitrile added dropwise over a period of 20 minutes while keeping the temperature of the reaction mixture at 79–86° C. by regulating the speed of addition. The stirred reaction mixture was then maintained under reflux (82°) for 40 minutes. The system was then put under a water pump vacuum and heated under full water pump vacuum for approximately 10 minutes at 85–95° C. to remove any unreacted acrylonitrile and methanol catalyst.

239 grams of the polymeric fat acid amine acrylonitrile adducts which remained were then charged into a one liter high pressure hydrogenation autoclave. 24 grams of water-wet Raney nickel catalyst and 6 cc. of methanol were added and the autoclave sealed. The autoclave was put under water pump vacuum to remove air and then 13 grams of anhydrous ammonia gas was added. The mixture was heated with agitation to 113° C. and hydrogen gas introduced to give a total pressure of approximately 410 p.s.i. Rapid uptake of hydrogen occurred. The reaction mixture was maintained at 120° C. until the uptake of hydrogen had ceased. The reaction mixtures was cooled and the pressure relieved in the autoclave by venting the gases. The contents were then filtered to remove the catalyst. The polymeric fat acid diamines thus obtained were in the form of a viscous liquid. The identity of these compounds was further confirmed by the determination of the tertiary, secondary and primary amine numbers by titration with KOH. The tertiary amine number was found to be 5.9, the secondary amine number 125 and the primary amine number 138 (theoretical amine numbers based on the equivalent weight of 278 for the polymeric fat acid nitrile: tertiary amine number 0, secondary amine number 165 and primary amine number 165).

To determine the effectiveness of the polymeric fat acid diamines as inhibitors for corrosion of ferrous metals by water containing hydrogen sulfide, the following test in which a control was used was conducted. Measured amounts of the polymeric fat acid diamines to be tested were added to one liter flasks, each containing 100 milliliters of kerosene. The flasks were filled with the de-aerated water containing 5% sodium chloride and 500 parts per million of hydrogen sulfide. Tared mild steel 16 gauge coupons, one inch square were suspended on glass hooks and lowered into the water phases in the flask. The oxygen-free flasks were then sealed and stored under static conditions at ambient temperatures for 7 days. The panels were then removed from the flask, dipped in dilute inhibited hydrochloric acid, rubbed to remove corrosion products, and rinsed in distilled water, dried and weighed, and compared to the control. The testing indicated that the polymeric fat acid diamine at 75 parts per million was 93% effective in inhibiting corrosion. At 10 parts per million the polymeric fat acid diamine was 93% effective and at 5 parts per million 78% effective in inhibiting the corrosion of the steel coupons.

The 78% inhibition of corrosion exhibited when polymeric fat acid diamine is present in the concentration of 5 parts per million is believed highly significant and unexpected, for the polymeric fat acid amine at the same concentration is only 18% effective.

It will be readily apparent to those skilled in the art that while we have described the preparation of mixtures of polymeric fat acid diamines, it is of course possible by distillation and other fractionating methods to obtain a specific polymeric fat acid diamine such as dimer fat acid tetramine, free of other polymeric materials.

The embodiments of the invention in which an exclusive property or privilege is claimed are defined as follows:

1. The polymeric fat acid diamines having the formula $R(CH_2NHCH_2CH_2CH_2NH_2)_n$ in which R is the hydrocarbon radical of the polymeric fat acids $R(COOH)_n$ obtained by polymerization of an unsaturated higher fatty acid, and $n$ is 2–3.

2. The method of preventing the corrosion of metallic surfaces in contact with aqueous media which comprises introducing into the aqueous media a compound selected from the group consisting of polymeric fat acid diamines and the salts of polymeric fat acid diamines.

References Cited in the file of this patent

UNITED STATES PATENTS

| | | |
|---|---|---|
| 2,900,222 | Kahler et al. | Aug. 18, 1959 |
| 2,913,305 | Andersen | Nov. 17, 1959 |
| 2,925,434 | Parker | Feb. 16, 1960 |
| 2,935,524 | Knox et al. | May 3, 1960 |

UNITED STATES PATENT OFFICE
CERTIFICATE OF CORRECTION

Patent No. 3,010,782 .   November 28, 1961

Kirtland E. McCaleb et al.

It is hereby certified that error appears in the above numbered patent requiring correction and that the said Letters Patent should read as corrected below.

Column 1, line 19, after "water" insert -- , water --; line 70, for "R(CH$_2$NHCH$_2$CH$_2$CH$_2$-CN)$_n$" read -- R(CH$_2$NHCH$_2$CH$_2$-CN)$_n$ --; column 2, line 60, for "mixtures" read -- mixture --.

Signed and sealed this 17th day of April 1962.

(SEAL)
Attest:

ESTON G. JOHNSON
Attesting Officer

DAVID L. LADD
Commissioner of Patents